United States Patent
Yamazaki et al.

(10) Patent No.: US 7,297,439 B2
(45) Date of Patent: Nov. 20, 2007

(54) BATTERY

(75) Inventors: Masato Yamazaki, Sagamihara (JP);
Takaaki Watanabe, Yokohama (JP)

(73) Assignee: Kyocera Corporation, Kyoto (JP)

( * ) Notice: Subject to any disclaimer, the term of this patent is extended or adjusted under 35 U.S.C. 154(b) by 245 days.

(21) Appl. No.: 10/373,239

(22) Filed: Feb. 25, 2003

(65) Prior Publication Data

US 2003/0211385 A1  Nov. 13, 2003

(30) Foreign Application Priority Data

Feb. 26, 2002 (JP) .............................. 2002-050431

(51) Int. Cl.
*H01M 2/26* (2006.01)

(52) U.S. Cl. ...................... 429/121; 429/178

(58) Field of Classification Search ...................... None
See application file for complete search history.

(56) References Cited

U.S. PATENT DOCUMENTS

| 5,229,641 | A | * | 7/1993 | Katayama | ................... | 257/678 |
| 5,912,092 | A | * | 6/1999 | Maruyama et al. | ........... | 429/96 |
| 6,929,879 | B2 | * | 8/2005 | Yamazaki | ................... | 429/158 |
| 2002/0150815 | A1 | * | 10/2002 | Ehara | ........................ | 429/90 |
| 2003/0008208 | A1 | * | 1/2003 | Yamazaki | ................... | 429/158 |

FOREIGN PATENT DOCUMENTS

| GB | 2 372 876 | 9/2002 |
| JP | 7-220700 | 8/1995 |
| JP | 7220700 | * 8/1995 |
| JP | 8-329913 | 12/1996 |
| JP | 11-026029 | 1/1999 |
| JP | 11-162423 | 6/1999 |
| JP | 2000-315483 | 11/2000 |
| WO | WO 00/65888 | 11/2000 |

OTHER PUBLICATIONS

Search Report Under Section 17 dated Apr. 11, 2003.
Notice of Reasons for Rejection dated Feb. 18, 2005 (w/English-language translation of Japanese-language document).

* cited by examiner

*Primary Examiner*—John S. Maples
(74) *Attorney, Agent, or Firm*—Joel E. Lutzker; John C. Garces; Schulte Roth & Zabel LLP

(57) ABSTRACT

A battery including a battery cell provided with an electrode terminal protruding from a side, a circuit board attached along sides of the battery cell, and a resin mould section which partially covers the circuit board and the battery cell, thereby integrating them. The circuit board includes rigid base sections for mounting components, and a flexible base section which connects between the rigid base sections and can bend flexibly. The rigid base section is provided with a pierced aperture, which pierces the rigid base section in the thickness direction, and into which an electrode terminal is fitted, and an electrically conductive material which is electrically connected to the wiring of the rigid base section, and electrically connected to the electrode terminal provided in the pierced aperture. The circuit board may be easily positioned in relation to the battery cell.

3 Claims, 9 Drawing Sheets

PRIOR ART

FIG. 10

PRIOR ART

BATTERY

CROSS REFERENCE TO RELATED APPLICATIONS

This application claims all rights of priority to Japanese Patent Application No. 2002-050431 filed on Feb. 26, 2002, (pending).

BACKGROUND OF THE INVENTION

The present invention relates to batteries of a form where a circuit board is integrated with a battery cell by a resin mould section.

Figure 9:
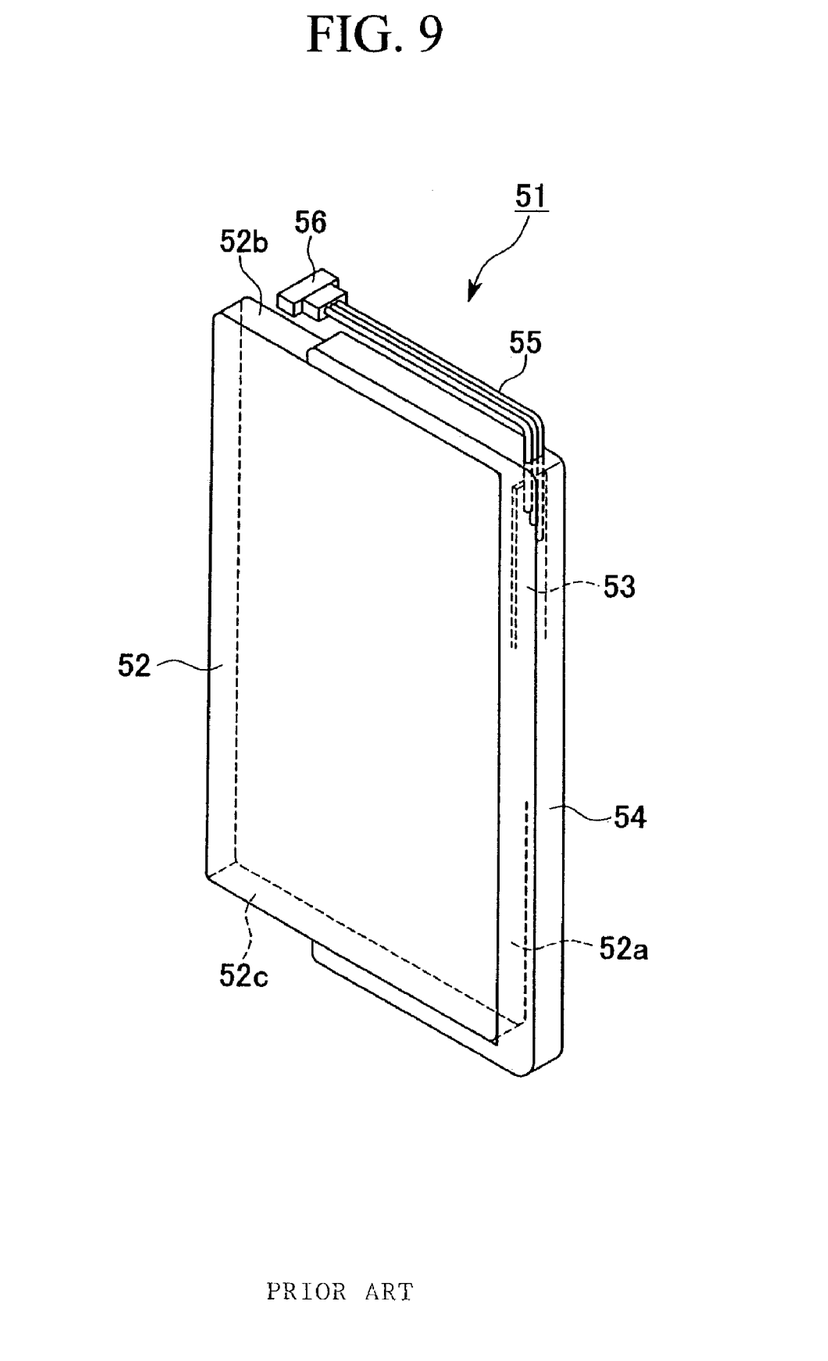
FIG. 9 is a perspective view showing an example of a conventional battery.

As shown in FIG. 9, battery 51 is a conventional battery for use in portable terminals such as cell phones, simple portable telephones and the like.

This battery 51 comprises a rectangular tabular battery cell 52, a circuit board 53 positioned along a side 52a of the battery cell 52, a resin mould section 54 fixed to sides 52a, 52b, and 52c of the battery cell 52, a cable 55 leading from the resin mould section 54, and a connection terminal 56 provided on the end of the cable 55.

Figure 10:
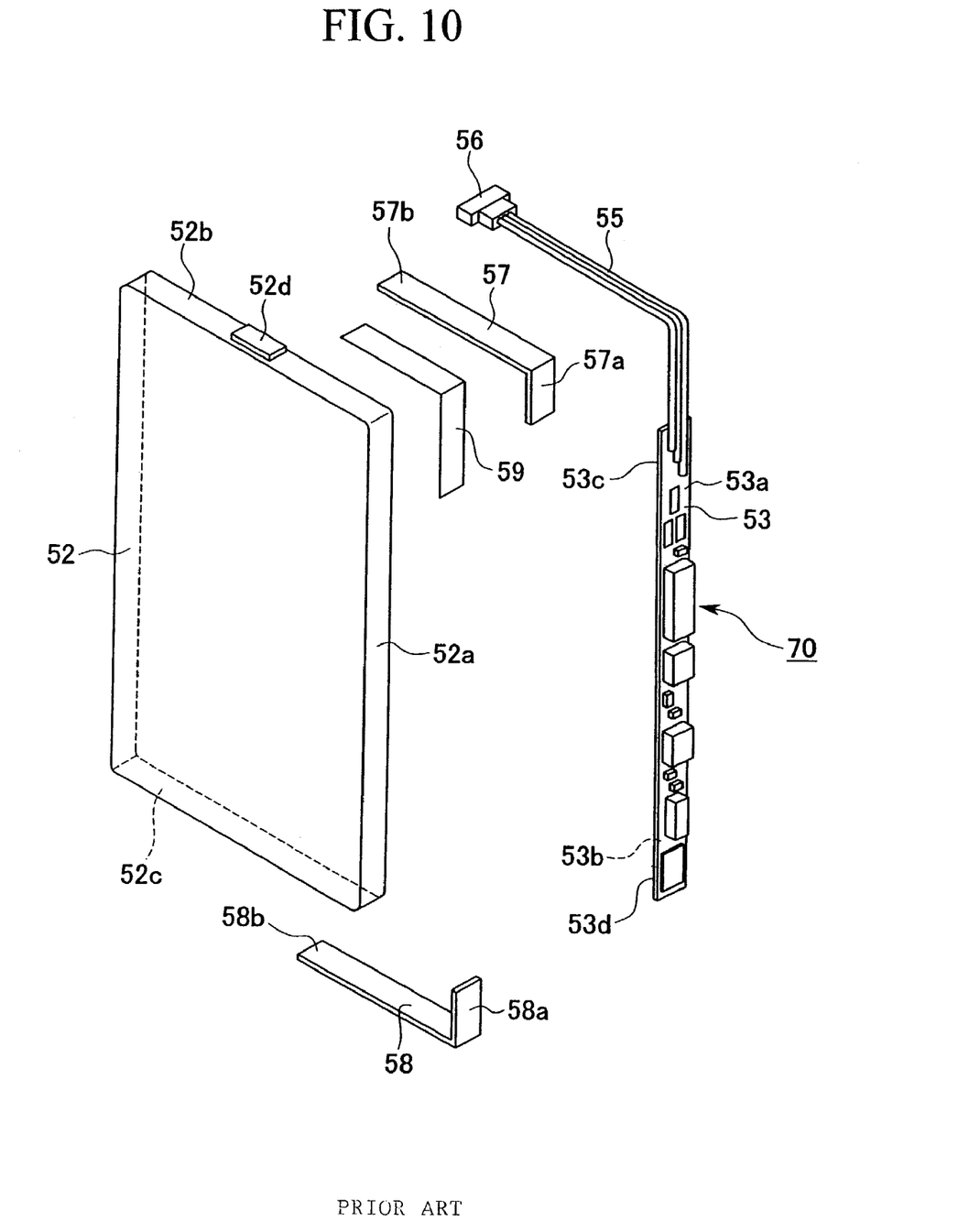
FIG. 10 is a perspective view showing the state of the battery in FIG. 9, with a resin mould section removed from the battery, and disassembled into a battery cell, a circuit board and a connection board.

The battery cell 52 is formed by enclosing an electrolyte together with a laminate of several layers of positive film and negative film separated by a separator, inside a container made by deep drawing aluminum or aluminum alloy. Also, as shown in FIG. 10, a negative electrode terminal 52d is positioned so as to protrude from the center of the side 52b of the battery cell 52, and the other surfaces of battery cell 52 form the positive electrode terminal.

The circuit board 53 is provided with electronic components 70 for charge control of the battery cell 52, and is attached to the side 52a of the battery cell 52. Furthermore, the circuit board 53 is connected to the positive electrode terminal and to the negative electrode terminal 52d of the battery cell 52 by metal connection plates 57 and 58.

These connection plates 57 and 58 are made of metal plate bent into an L-shape, and the circuit board 53 and the battery cell 52 are electrically connected by soldering their distal ends 57a and 58a to a rear face 53b of ends 53c and 53d of the circuit board 53, and soldering the other ends 57b and 58b to the negative electrode terminal 52d and the positive electrode terminal respectively.

Here, because the other end 57b of the connection plate 57 is positioned along the sides 52a and 52b of the battery cell, an insulation sheet 59 is provided between the battery cell 52 and the connection plate 57, so that the connection plate 57 does not contact and short with the sides 52a and 52b which constitute the positive electrode terminal.

These connection plates 57 and 58 are positioned so as to hold the battery cell 52, so that the circuit board 53 is fixed to the battery cell 52. Next, the circuit board 53 and connection plates 57 and 58 which are fixed to the battery cell 52, are enveloped by a resin mould section 54, and thus formed integral with the battery cell 52, as shown in FIG. 9.

The connection terminal 56 is for supplying power from the battery cell 52 to a portable terminal (not shown in the figure), by connecting to a connection terminal of the portable terminal, and is connected to the cable 55. The cable 55 is soldered to the front face 53a side of the end 53c of the circuit board 53, as shown in FIG. 10.

However, in the above mentioned battery 51, the positioning of the circuit board 53 in relation to the battery cell 52 is problematic, due to the circuit board 53 being connected by soldering to the side 52a of the battery cell 52 through the connection plates 57 and 58.

Furthermore, with regard to the recent demand for miniaturization of portable terminals, the existence of the cable 55 limits the extent to which miniaturization of the battery is possible.

Moreover, because the terminals of the battery cell 52 are connected to the portable terminal through the cable 55, this introduces an extra impedance between the battery cell 52 and the portable terminal, with the problem of a drop in power supply efficiency of the battery cell 52.

SUMMARY OF THE INVENTION

The present invention was conceived to solve the problems of the prior art described above and its object is to provide a battery in which the positioning of the circuit board in relation to the battery cell can be easily performed.

In order to solve the above problem, a first aspect of the invention proposes a battery comprising a battery cell provided with an electrode terminal protruding from at least one side, a circuit board attached along at least two sides of the battery cell, and a resin mould section which at least partially covers this circuit board and battery cell, thereby integrating them. The circuit board comprises at least two rigid base sections for mounting components, and a flexible base section which is connected between the two rigid base sections. The rigid base section is provided with a pierced aperture, which pierces the rigid base section in the thickness direction, and into which the electrode terminal is fitted, and an electrically conductive material which is electrically connected to wiring of the rigid base section, and which is electrically connected to the electrode terminal provided in the pierced aperture.

According to this aspect, when one rigid base section is positioned on one side of a battery cell, it is possible to position the other rigid base section along the other side, by bending the flexible base section.

Furthermore, because the rigid base section is fixed to the side of the battery cell by fitting the protruding electrode terminal into the pierced aperture in the rigid base section, it is possible to accurately and easily position the rigid base section in relation to the side of the battery cell.

Then, by positioning the electrically conductive material in this pierced aperture and electrically connecting the protruding electrode terminal and the circuit board, power is supplied from the battery cell to each component on the circuit board.

Furthermore, a second aspect of the invention proposes for the battery according to the first aspect wherein the components include a connection terminal exposed to the outside and which is fixed to the rigid base section provided with the pierced aperture.

According to this aspect, because the connection terminal together with the circuit board are integrated into the battery cell by the resin mould section, it is possible to achieve miniaturization of the battery. Furthermore, because the connection terminal is fixed directly to the circuit board without connecting through a cable, it is possible to achieve a reduced impedance when supplying power to the load of a portable terminal or other terminal.

Moreover, because the connection terminal is fixed to the rigid base section provided with the pierced aperture, accurate positioning of the connection terminal in relation to the battery cell is favorably obtained.

Furthermore, a third aspect of the invention proposes a mounting structure for a circuit board, which mounts a circuit board on a battery cell provided with an electrode terminal protruding from at least one side. The circuit board comprises at least two rigid base sections for mounting components, and a flexible base section connected between the two rigid base sections. The rigid base section is provided with a pierced aperture, which pierces the rigid base section in the thickness direction, and into which the electrode terminal is fitted. An electrically conductive material is positioned on the pierced aperture and electrically connected to wiring of the rigid base section. The electrically conductive material and an electrode terminal fitted into the pierced aperture are electrically connected.

According to this aspect, when one rigid base section is positioned on one side of the battery cell, it is possible to position the other rigid base section along an other side by bending the flexible base section.

Furthermore, because the rigid base section is fixed to the side of the battery cell by fitting the protruding electrode terminal into the pierced aperture in the rigid base section, it is possible to accurately and easily position the rigid base section in relation to the side of the battery cell.

Then, by positioning the electrically conductive material in this pierced aperture and electrically connecting the protruding electrode terminal and the circuit board, power is supplied from the battery cell to each component on the circuit board.

Furthermore, a fourth aspect of the invention proposes for the mounting structure for a circuit board according to the third aspect wherein the electrically conductive material and the electrode terminal are connected by welding.

According to this aspect, the battery cell and the circuit board are electrically connected, by welding the electrically conductive material positioned in the pierced aperture to the electrode terminal fitted into the pierced aperture.

BRIEF DESCRIPTION OF DRAWINGS

A full understanding of the invention can be gained from the following description of the preferred embodiments when read in conjunction with the accompanying drawings in which.

DETAILED DESCRIPTION OF THE INVENTION

This invention solves the problems of prior art by providing a battery in which the positioning of the circuit board in relation to the battery cell can be easily performed.

Figure 1:
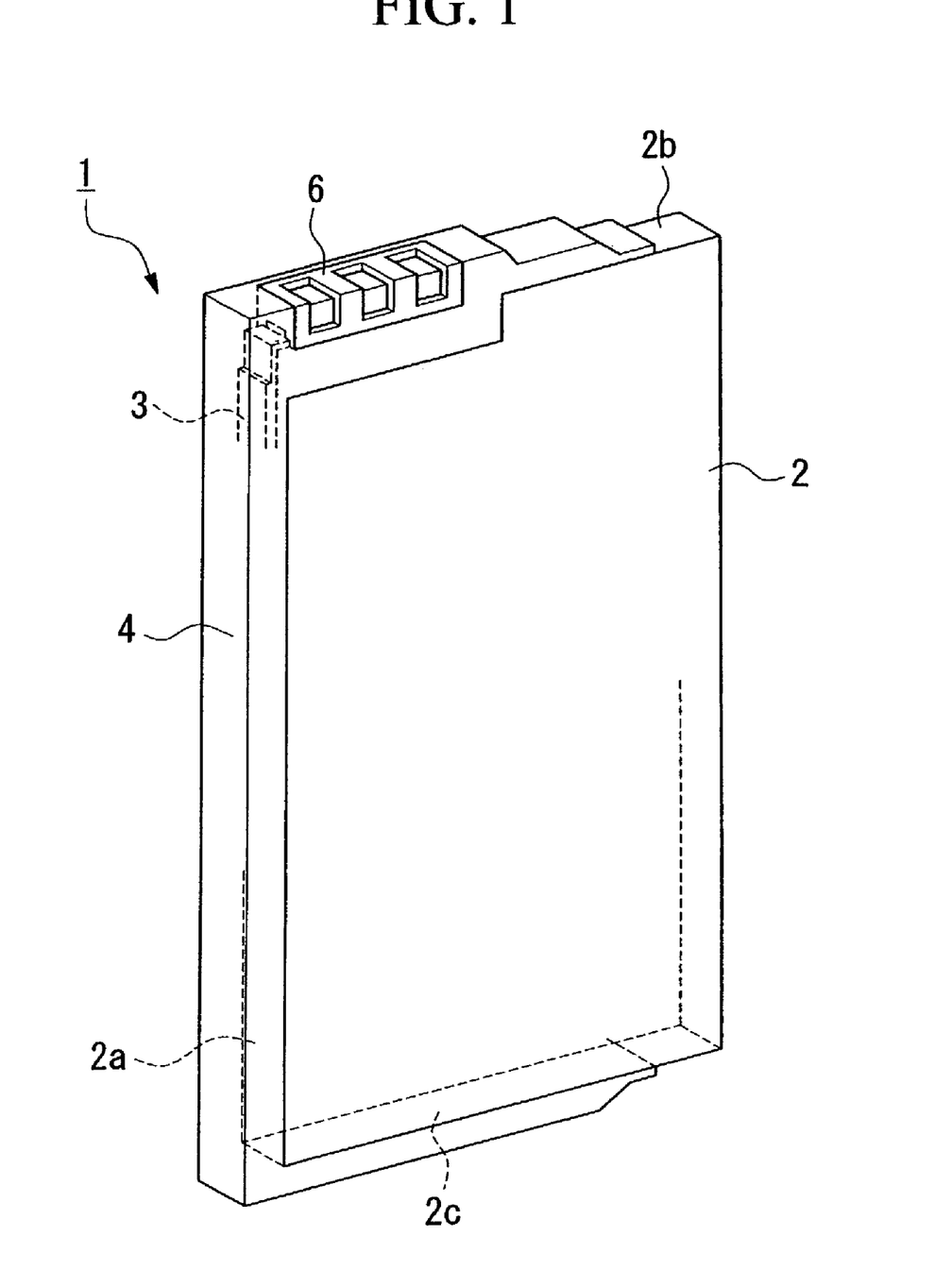
FIG. 1 is a perspective view showing a battery according to a first embodiment of the present invention.

FIGS. 1 to 7 demonstrate a first embodiment according to the present invention. As shown in FIG. 1, a battery 1 comprises a rectangular tabular battery cell 2, a circuit board 3 positioned along narrow sides 2a, 2b, and 2c of the battery cell 2, and a resin mould section 4 enveloping the circuit board 3 and secured to the sides 2a, 2b, and 2c of the battery cell 2.

Figure 2:
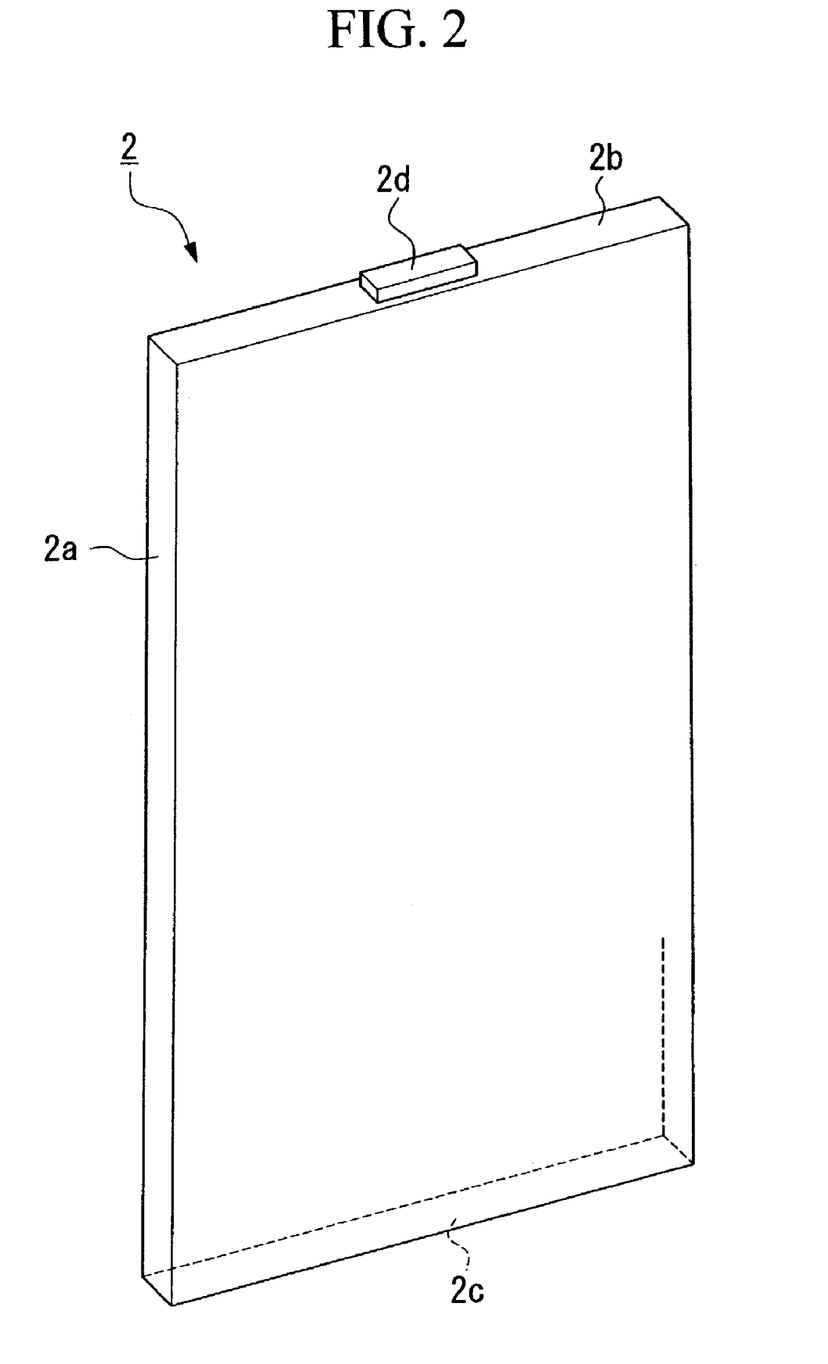
FIG. 2 is a perspective view showing a battery cell used in the battery of FIG. 1.

The battery cell 2 is of the same configuration as mentioned above, with the separator, electrodes, and electrolyte enclosed inside a rectangular tabular container formed of aluminum alloy or other material. As shown in FIG. 2, a negative electrode terminal 2d is formed protruding from the center of the side 2b, and the surfaces of the battery cell 2 excluding the negative electrode terminal 2d are formed as the positive electrode terminal. Therefore, the protruding negative electrode terminal 2d is electrically insulated from the side 2b.

Figure 3:
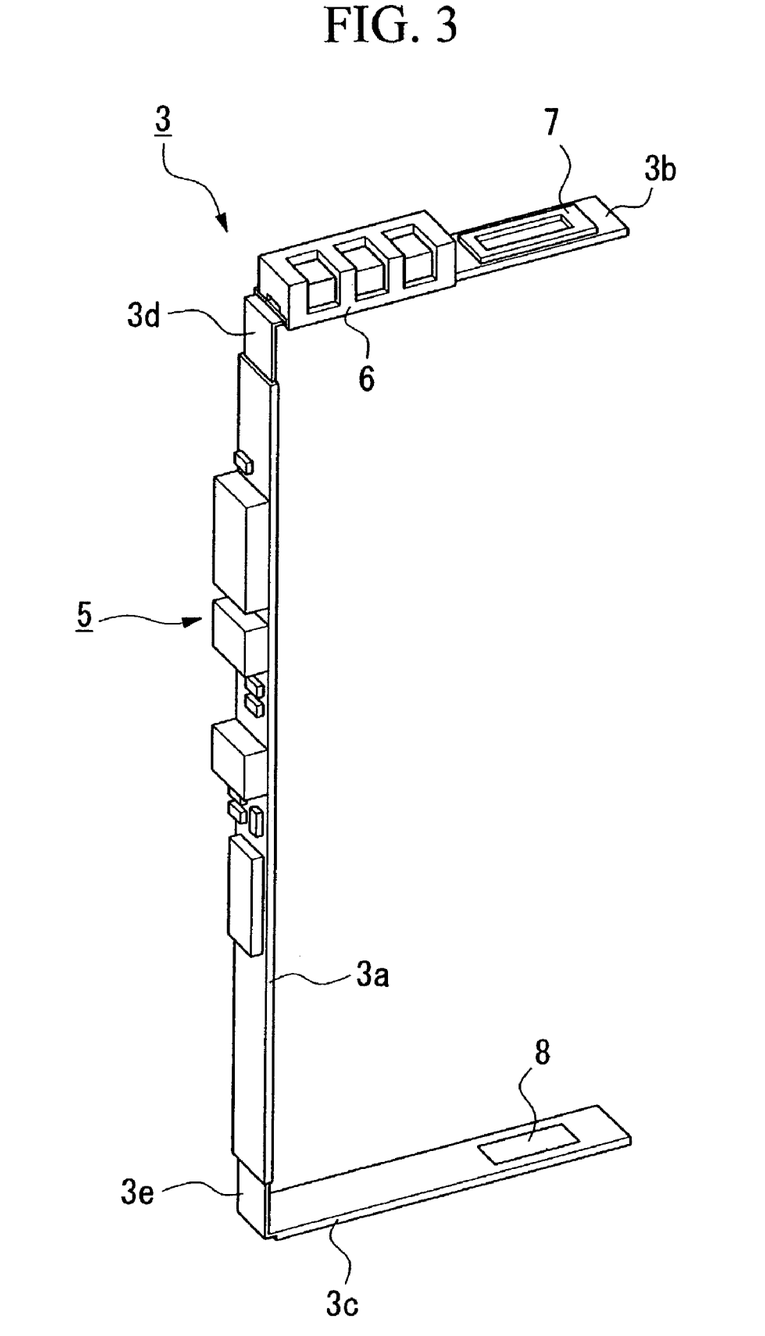
FIG. 3 is a perspective view showing a circuit board used in the battery of FIG. 1.

As shown in FIG. 3, the circuit board 3 is of a narrow shape in order to be positioned along the side of the battery cell, and comprises rigid base sections 3a, 3b, and 3c, and flexible base sections 3d and 3e. These rigid base sections 3a, 3b, and 3c, and flexible base sections 3d and 3e are formed integrally.

The rigid base sections 3a, 3b, and 3c are a laminate of several layers of synthetic resin wiring sheets. These wiring sheets are ones where wiring conductors are formed by a photolithography technique on the surface. By laminating several layers of these wiring sheets, it is possible to provide a large number of wires in the narrow rigid base sections 3a, 3b, and 3c. Here, because these rigid base sections 3a, 3b, and 3c are laminates of the same number of wiring sheets, they have equal thickness.

Figure 5:
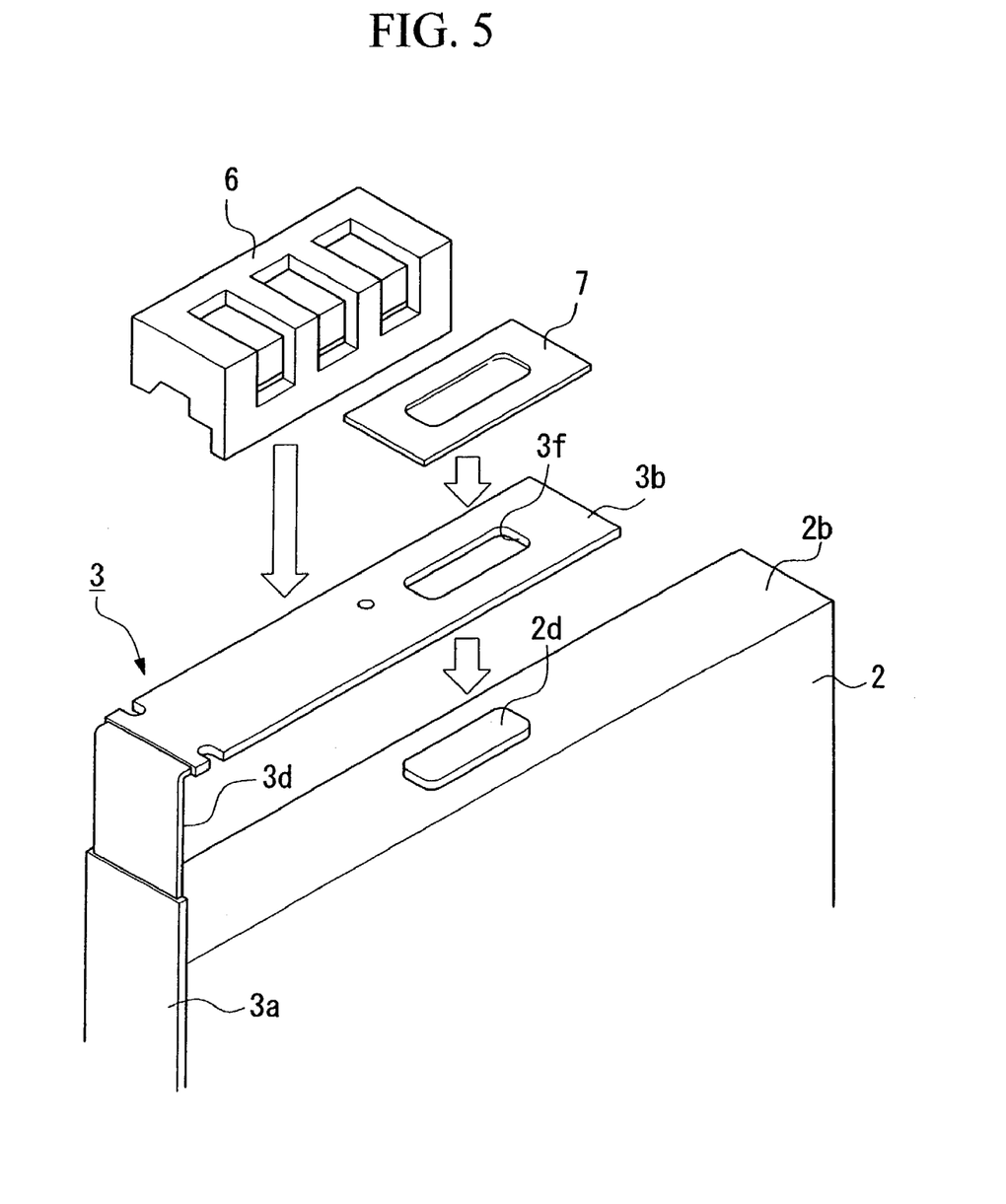
FIG. 5 is an enlarged view showing the state of the battery in FIG. 1, with the resin mould section removed from the battery, and disassembled into a battery cell, rigid base sections, a connection terminal and an electrically conductive material.

A plurality of electronic components 5 for battery cell charge control and over-current protection are provided on the front face of rigid base section 3a. A connection terminal 6 for electrically connecting to a portable terminal (not shown in the figure), an electrically conductive material 7 for electrically connecting to the negative electrode terminal of a battery cell, are provided on the front face of the rigid base section 3b. Also, as shown in FIG. 5, a pierced aperture 3f is formed in this rigid base section 3b, for fitting the negative electrode terminal 2d of the battery cell 2.

Figure 6:
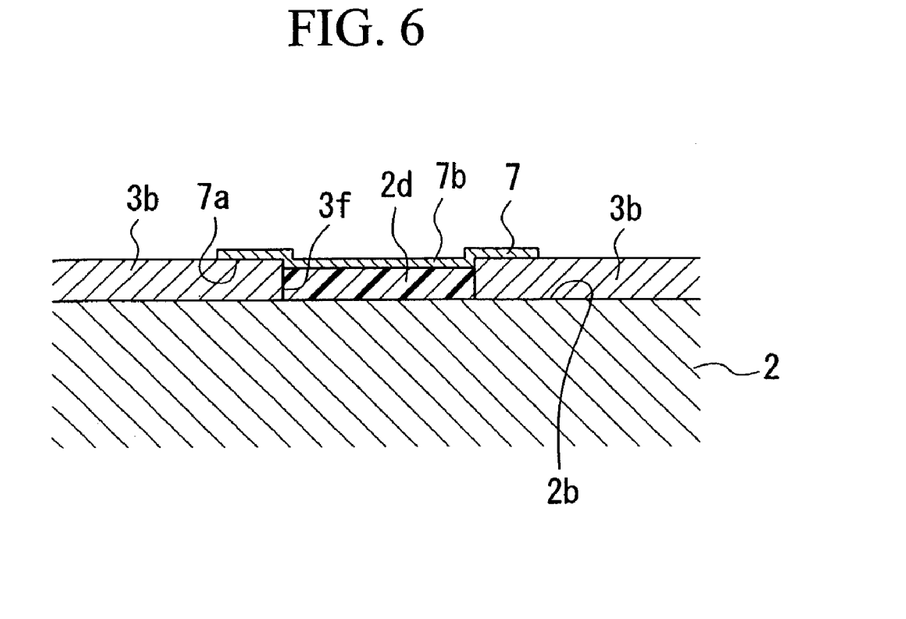
FIG. 6 is an enlarged cross-sectional view showing the state of the battery in FIG. 1, with a negative electrode terminal and an electrically conductive material fitted into a pierced aperture in the rigid base section.

As shown in FIG. 6, the electrically conductive material 7 is formed with a protruding section 7b which protrudes from a surface 7a thereof. The protruding section 7b is shaped so as to fit in the pierced aperture 3f. When the negative electrode terminal 2d is fitted into the pierced aperture 3f, this electrically conductive material 7 abuts with the negative electrode terminal 2d. Then, by spot welding the negative electrode terminal 2d to the electrically conductive material 7, the negative electrode terminal 2d of battery cell 2 and the rigid base section 3b are electrically connected.

Figure 7:
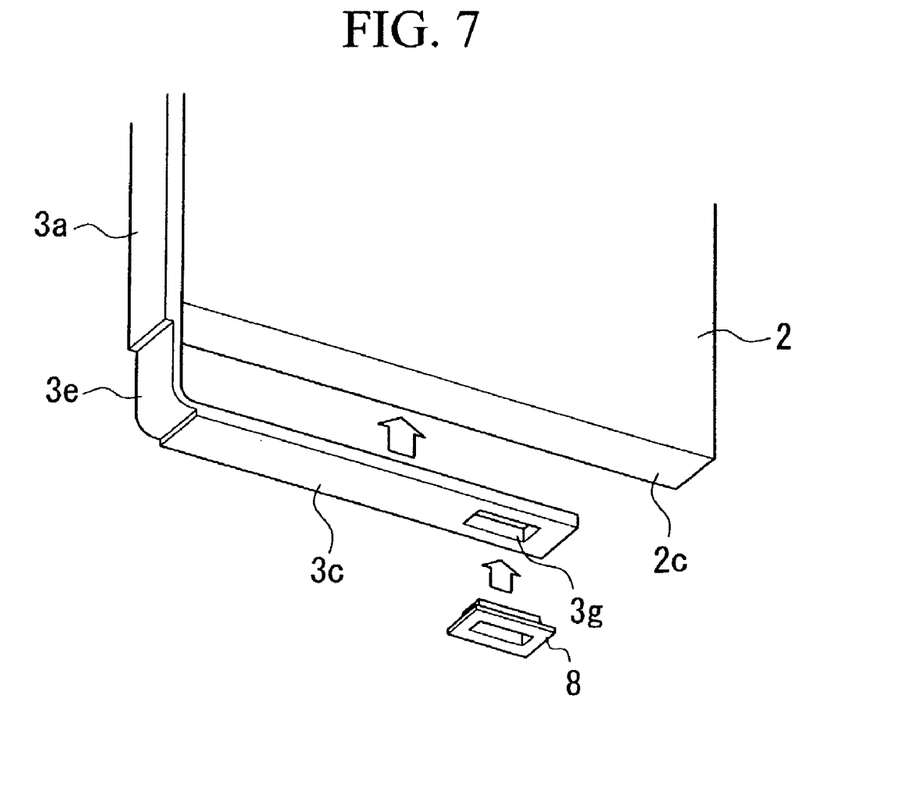
FIG. 7 is an enlarged view showing the state of the battery in FIG. 1, with the resin mould section removed from the battery, and disassembled into a battery cell, rigid base sections, and an electrically conductive material.

As shown in FIG. 7, a pierced aperture 3g is provided in the rigid base section 3c, pierced in thickness direction thereof, and an electrically conductive material 8 is able to be fitted into this pierced aperture 3g.

Figure 8:
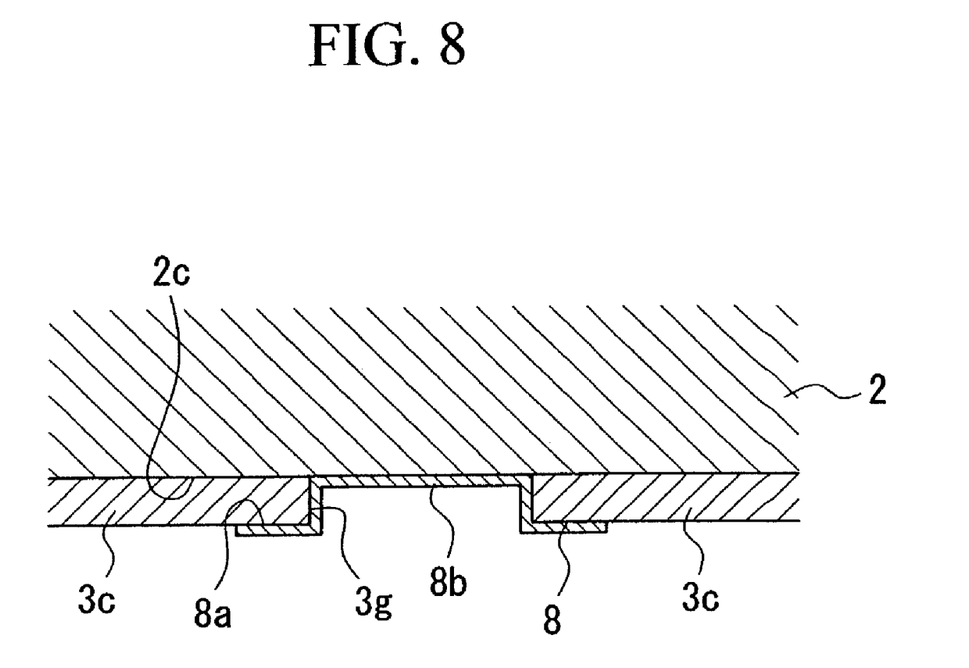
FIG. 8 is an enlarged cross-sectional view showing the state of the battery in FIG. 1, with the electrically conductive material fitted into a pierced aperture in the rigid base section.

That is, as shown in FIG. 8, the electrically conductive material 8 is formed with a protruding section 8b which protrudes from a surface 8a thereof. The protruding section 8b is shaped so as to fit in the pierced aperture 3g. This electrically conductive material 8, when fitted into the pierced aperture 3g, abuts with the side 2c as well as the rigid base section 3c. Then, by spot welding the electrically conductive material 8 to the side 2c, the positive electrode terminal of battery cell 2 and the rigid base section 3c are electrically connected.

Figure 4:
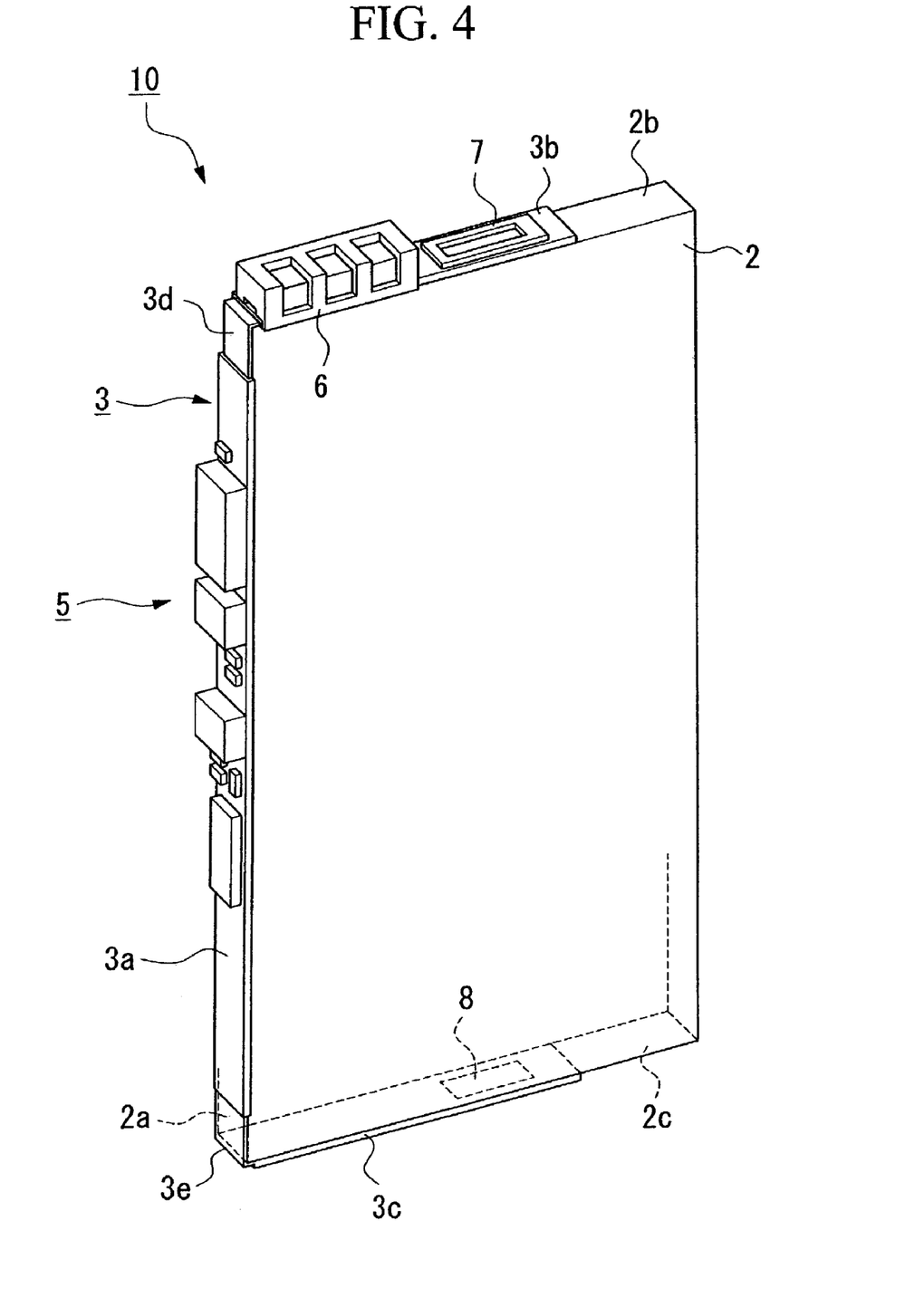
FIG. 4 is a perspective view showing the state of the battery in FIG. 1, before formation of a resin mould section.

As shown in FIG. 3, the flexible base sections 3d and 3e are made by extending one part of the laminated wiring sheet of the rigid base section 3a, 3b, and 3c, and are thus flexible and able to be bent. Therefore, as shown in FIG. 4, the rigid base sections 3a, 3b, and 3c can be respectively positioned on the sides 2a, 2b, and 2c of the battery cell 2, by bending these flexible base sections 3d and 3e. Furthermore, by electrically connecting the negative electrode terminal of the battery cell 2 to the rigid base section 3b, and the positive electrode terminal to the rigid base section 3c, the battery cell 2 and the circuit board 3 are electrically connected, enabling power of the battery cell 2 to be supplied from the connection terminal 6 to a portable terminal.

In the above manner, the battery 1 is constructed by enveloping the circuit board 3 in resin with the circuit board 3 positioned on the sides 2a, 2b, and 2c of battery cell 2, and by forming the resin mould section 4 as shown in FIG. 1, the circuit board 3 is fixed to the battery cell 2.

A production method for the battery 1 constructed in the above manner will now be explained.

Firstly, as shown in FIG. 4, the electronic components 5 are fixed to the rigid base section 3a, and the connection terminal 6 and the electrically conductive material 7 are fixed to the rigid base section 3b. Furthermore, the electrically conductive material 8 is fixed to the rigid base section 3c. Afterwards, the negative electrode terminal 2d protruding from the side 2b is fitted into the pierced aperture 3f, the rigid base section 3b is fixed along the side 2b, and the electrically conductive material 7 and the negative electrode terminal 2d are abutted with each other, as shown in FIG. 5. Next, the flexible base sections 3d and 3e are bent, and the rigid base sections 3a and 3c are positioned along the sides 2a and 2c of the battery cell 2, as shown in FIG. 4. Then the electrically conductive materials 7 and 8, and the negative electrode terminal 2d and the positive electrode terminal are electrically connected by spot welding. Consequently, a battery unit 10 with the circuit board 3 and the battery cell 2 electrically connected is formed.

Next, this battery unit 10 is housed in a metallic mould (not shown in the figure). The metallic mould with the battery unit 10 housed thereinside, has a cavity for forming the resin mould section 4 shown in FIG. 1, and an inlet is provided facing this cavity for supplying resin. By supplying resin from this inlet, the resin mould section 4 enveloping the circuit board 3 is formed.

According to the battery 1 of the above embodiment, since the rigid base section 3b is fixed to the side 2b of the battery cell 2 by fitting the protruding negative electrode terminal 2d into the pierced aperture 3f of the rigid base section 3b, positioning of the rigid base sections 3a, 3b, and 3c in relation to, the sides 2a, 2b, and 2c of the battery cell 2 can be performed accurately and easily.

Furthermore, since the electrically conductive materials 7 and 8 fitted into the pierced apertures 3f and 3g, and the negative electrode terminal 2d and the positive electrode terminal fitted into the pierced aperture 3f can be simply welded, then electrical connection between the battery cell 2 and the circuit board 3 can be easily performed.

Moreover, because the rigid base sections 3a, 3b, and 3c have equal thickness, it is possible to fix the connection terminal 6 and the electrically conductive material 7 to the rigid base section 3b, and fix the electrically conductive material 8 to the rigid base section 3c, at the same time as fixing the electronic components 5 to the rigid base section 3a.

Therefore, because of the above-mentioned structure it is possible to reduce the production time for the battery 1 and cut down on production costs.

Also, because the connection terminal 6 is fixed to the rigid base section 3b, a cable for connecting the connection terminal to the circuit board is unnecessary. Therefore, it is possible to achieve a lower impedance when supplying power from the battery cell 2 to a portable terminal, and an improvement in power supply efficiency of the battery cell 2. Also, it is possible to achieve miniaturization of the battery 1, and miniaturization of a portable terminal in which this battery 1 is mounted.

Moreover, because the connection terminal 6 is fixed to the rigid base section 3b which is provided with the pierced aperture 3f, it is possible to favorably obtain accurate positioning of the connection terminal 6 in relation to the battery cell 2. Therefore, electrical connection with a portable terminal can be reliably performed.

In the above embodiment, the rigid base sections 3a, 3b, and 3c are ones where the wiring sheets are laminated in several layers. However, its construction is not limited to this, and may be such that a board of synthetic resin having a predetermined thickness and provided with wiring in the interior for connection to the electronic components 5 and the like is provided on one or a number of wiring sheets. In this case, the part of the wiring sheets which is provided with the board of synthetic resin constitutes the rigid base sections 3a, 3b, and 3c, and the part with only the wiring sheets constitutes the flexible base sections 3d and 3e.

Also, the electrically conductive material 7 having the protruding part 7b is fitted to the pierced aperture 3f. However, an electrically conductive material with no protruding part may be positioned in the pierced aperture 3f. However, in this case, it is necessary for the thickness of the negative electrode terminal 2d to be the same as the thickness of the rigid base section 3a, so that the electrically conductive plate material and the negative electrode terminal 2d can abut with each other.

Moreover, the rigid base sections 3a, 3b, and 3c have equal thickness to facilitate the connection terminal 6 and the electrically conductive material 7 to the rigid base section 3b. However, in cases where shortening of the production time for the battery 1 is not taken into account, the rigid base sections need not be the same thickness.

Also, the rigid base sections 3a, 3b and 3c are attached along the three sides 2a, 2b, and 2c of the battery cell 2. However, it is sufficient if at least the rigid base sections 3a and 3b are attached along the sides 2a and 2b. In this case, the pierced aperture is provided in the rigid base section 3a in the thickness direction thereof, and the positive electrode terminal of the battery cell 2 is electrically connected to the circuit board by fitting the electrically conductive material into this pierced aperture, and abutting this electrically conductive material against the side 2a of the battery cell 2.

As described above, according to the first aspect of the invention, positioning of the rigid base sections in relation to the sides of the battery cell can be performed accurately and easily. Therefore, it is possible to shorten the production time and cut down on production costs.

Also, according to the second aspect of the invention, it is possible to miniaturize the battery. Therefore, it is also possible to miniaturize, for example, a portable terminal in which this battery is mounted. Also, because it is possible to lower the impedance when supplying power to the load of a portable terminal or other terminal, it is possible to improve the efficiency of power supply to the load of the portable terminal or other terminal.

Moreover, since it is possible to favorably obtain accurate positioning of the connection terminal in relation to the battery cell, electrical connection to the load of a portable terminal or other terminal can be reliably performed.

Furthermore, according to the third aspect of the invention, since positioning of the rigid base sections in relation to the sides of the battery cell can be performed accurately and easily, it is possible to shorten the production time and cut down on production costs.

Also, according to the fourth aspect of the invention, since electrical connection between the battery cell and the circuit board can be easily performed, it is possible to shorten the production time and cut down on production costs.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A battery comprising:

a battery cell having a plurality of sides provided with an electrode terminal protruding from at least one of said sides;

a circuit board having electronic components attached along at least two of said sides of said battery cell; and a resin mold section at least partially covering said circuit board and joined to said circuit board and said battery cell;

wherein said circuit board comprises at least two rigid base sections having wiring, and a flexible base section connected between said two rigid base sections and is more flexible than said two rigid base sections;

wherein one said rigid base section is provided with a pierced aperture and an electrically conductive material;

wherein said pierced aperture pierces said rigid base section in the thickness direction;

wherein one said rigid base section is positioned on one side of said battery cell and said electrode terminal of said one side is fitted into said pierced aperture; and another said rigid base section is positioned on another side adjacent to said one side of a battery cell;

wherein said electrically conductive material is electrically connected to said wiring of one said rigid base section and electrically connected to said electrode terminal provided in said pierced aperture;

wherein a second rigid base section is provided with a pierced aperture and an electrically conductive material; and wherein said electrically conductive material of said second rigid base section is electrically connected to said wiring of said second rigid base section and electrically connected to said battery cell.

2. A battery according to claim 1, wherein said electronic components further comprise a connection terminal exposed to the outside; and wherein said connection terminal is fixed to said rigid base section provided with said pierced aperture.

3. A battery according to claim 1, wherein said battery cell is in a rectangular plate-shape having narrow edges; and wherein said rigid base sections are positioned adjacent said narrow edges on said battery cell.

* * * * *